United States Patent
Sagi et al.

(10) Patent No.: US 11,678,093 B2
(45) Date of Patent: *Jun. 13, 2023

(54) NETWORKING HARDWARE AND SOFTWARE AND DATA CENTER TOPOLOGIES LEVERAGING SAME

(71) Applicant: INTERNATIONAL BUSINESS MACHINES CORPORATION, Armonk, NY (US)

(72) Inventors: Gal Sagi, Ramot Hashavim (IL); Eran Gampel, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,366

(22) Filed: Jun. 13, 2022

(65) Prior Publication Data
US 2022/0312090 A1    Sep. 29, 2022

Related U.S. Application Data

(62) Division of application No. 16/004,392, filed on Jun. 10, 2018, now Pat. No. 11,375,300.
(Continued)

(51) Int. Cl.
*H04Q 11/00* (2006.01)
*H04L 67/1097* (2022.01)

(52) U.S. Cl.
CPC ..... *H04Q 11/0071* (2013.01); *H04Q 11/0062* (2013.01); *H04L 67/1097* (2013.01);
(Continued)

(58) Field of Classification Search
None
See application file for complete search history.

(56) References Cited

U.S. PATENT DOCUMENTS

| 2014/0279768 A1* | 9/2014 | Rash | G06N 5/02 706/14 |
|---|---|---|---|
| 2015/0254201 A1 | 9/2015 | Billi | |

(Continued)

OTHER PUBLICATIONS

Lu et al., Server Switch: A Programmable and High Performance Platform for Data Center Networks, Mar. 2011, 14 pages.
(Continued)

*Primary Examiner* — Peter Chen
(74) *Attorney, Agent, or Firm* — Schmeiser, Olsen & Watts, LLP; Stephanie Carusillo

(57) ABSTRACT

A network interface card (NIC) and a method for stablishing a connection between virtual machines of a network. The NIC includes: a programmable switching ASIC (application-specific integrated circuit), a central processing unit (CPU), multiple Ethernet controllers, and multiple on-board transceivers functioning as external ports. The switching ASIC functions as a switch that manipulates data traffic within the NIC including by switching the data traffic between and among the CPU, the Ethernet controllers, and the on-board transceivers. The method includes: installing rules that route a Synchronize (SYN) packet from a source virtual machine (VM) through a software engine, appending a signed cookie to the SYN packet; verifying that a policy represented by the signed cookie appended to the SYN packet matches a policy of a destination VM; and returning the SYN packet to the source VM which establishes a connection between the source VM and the destination VM.

11 Claims, 10 Drawing Sheets

Related U.S. Application Data

(60) Provisional application No. 62/517,875, filed on Jun. 10, 2017.

(52) U.S. Cl.
CPC ........... *H04Q 2011/0041* (2013.01); *H04Q 2011/0058* (2013.01); *H04Q 2011/0086* (2013.01); *H04Q 2011/0096* (2013.01); *H04Q 2213/1301* (2013.01)

(56) References Cited

U.S. PATENT DOCUMENTS

| | | |
|---|---|---|
| 2015/0334010 A1 | 11/2015 | James |
| 2016/0192044 A1 | 6/2016 | Raza et al. |
| 2017/0149931 A1 | 5/2017 | Lochhead |
| 2018/0157532 A1 | 6/2018 | Kumar |
| 2018/0205785 A1 | 7/2018 | Caulfield et al. |
| 2018/0359329 A1* | 12/2018 | Vacaro .............. H04L 69/22 |
| 2018/0359544 A1 | 12/2018 | Sagie et al. |
| 2020/0065285 A1 | 2/2020 | Panella et al. |

OTHER PUBLICATIONS

Restriction Requirement (dated Dec. 2, 2019) U.S. Appl. No. 16/004,392, filed Jun. 10, 2018.
Restriction Requirement Response (dated Feb. 3, 2020) U.S. Appl. No. 16/004,392, filed Jun. 10, 2018.
Office Action (dated Apr. 13, 2020) U.S. Appl. No. 16/004,392, filed Jun. 10, 2018.
Amendment (dated Jul. 8, 2020) U.S. Appl. No. 16/004,392, filed Jun. 10, 2018.
Final Office Action (dated Oct. 8, 2020) U.S. Appl. No. 16/004,392, filed Jun. 10, 2018.
Final amendment (dated Dec. 3, 2020) U.S. Appl. No. 16/004,392, filed Jun. 10, 2018.
Advisory Action (dated Dec. 14, 2020) U.S. Appl. No. 16/004,392, filed Jun. 10, 2018.
RCE and amendment (dated Jan. 8, 2021) U.S. Appl. No. 16/004,392, filed Jun. 10, 2018.
Office Action (dated May 5, 2021) U.S. Appl. No. 16/004,392, filed Jun. 10, 2018.
Amendment (dated Aug. 5, 2021) U.S. Appl. No. 16/004,392, filed Jun. 10, 2018.
Final Office Action (dated Sep. 24, 2021) U.S. Appl. No. 16/004,392, filed Jun. 10, 2018.
Final amendment (dated Nov. 22, 2021) U.S. Appl. No. 16/004,392, filed Jun. 10, 2018.
Notice of Allowance (dated Dec. 17, 2021) U.S. Appl. No. 16/004,392, filed Jun. 10, 2018.
Appendix P; List of IBM Patents or Patent Applications Treated as Related; attached Jun. 8, 2022; 1 page.
Jun. 10, 2018, U.S. Appl. No. 16/004,392, 20180359544.

* cited by examiner

NETWORKING HARDWARE AND SOFTWARE AND DATA CENTER TOPOLOGIES LEVERAGING SAME

RELATED APPLICATION

This application is a divisional application claiming priority to Ser. No. 16/004,392, filed Jun. 10, 2018, which claims the benefit of priority under 35 USC § 119(e) of U.S. Provisional Patent Application No. 62/517,875 filed on Jun. 10, 2017, the contents of which are incorporated herein by reference in their entirety.

FIELD AND BACKGROUND OF THE INVENTION

The present invention relates to networking devices and software modules for use in data center clusters. Embodiments of the present invention relate to network interface cards, patch panels and software modules for minimizing latency and server hops in hyperscale topologies.

A data center includes servers packaged into racks forming a cluster that includes thousands of interconnected hosts each having one or more processors, a memory, a network interface, and a local high-speed I/O.

Data center and cluster topology typically follows a tree design in which traffic flows from the interne through a series of routers and switches. A typical data center network includes a data center router (gateway router), a cluster router (spine), layer 2 switches (leaf/spine) and a top of rack (ToR) switch (leaf) until finally being routed to specific hosts of the cluster (server/compute nodes).

The data-center network (from spine to servers) is generally regarded as a critical design element in the system architecture and the skeletal structure upon which processor, memory, and I/O devices are dynamically shared. As data centers transition to higher volumes of traffic per server (100 Gpbs), existing data center network design includes numerous bottlenecks which severely impact quality of service. The increase in cluster size increases latency and the number of hops between servers and increases congestion at networking services

SUMMARY OF THE INVENTION

According to one aspect of the present invention there is provided a server cluster comprising a plurality of servers arranged in X unit racks with each rack including Y servers, wherein each of the Y servers includes a peripheral component interconnect (PCI) card optically connecting each of the Y servers to all other servers in the rack and further wherein each server of the rack is optically connected via the PCI card to Z servers of other racks such that any server in the cluster is capable of optically communicating with any other server of the cluster and further wherein a path between any two servers is defined by a central processing unit (CPU) of the PCI card.

According to another aspect of the present invention there is provided an optical port routing enclosure comprising a plurality of optical ports and a mechanism for optically coupling selectable pairs of the plurality of optical ports, wherein each port pair is capable of connecting a first multi-port optical cable to a second multi-port optical cable and the mechanism defines the port pair.

According to yet another aspect of the present invention there is provided a programmable network interface card (NIC) for providing switching capabilities to a Virtual Entity of a server, the programmable NIC being configured for routing packets having session establishment flags through a software engine configured for modifying the packets by enforcing a service and/or adding a signature and routing the modified packets to a destination address.

BRIEF DESCRIPTION OF THE SEVERAL VIEWS OF THE DRAWING(S)

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 schematically illustrates data center topology.

FIG. 2 schematically illustrates an embodiment of the network interface card of the present invention.

FIGS. 3 and 4 schematically illustrate optical interconnects enabled by the card of FIG. 2.

FIG. 5A schematically illustrates rack, cluster node and cluster interconnect topologies enabled by the present invention.

FIGS. 5B-D illustrate interconnects between cluster nodes of 12 servers (FIGS. 5A-C) and a cluster formed therewith (FIG. 5D).

FIG. 6 schematically illustrates cluster to cluster interconnect topology enabled by the present invention.

Figure 9:
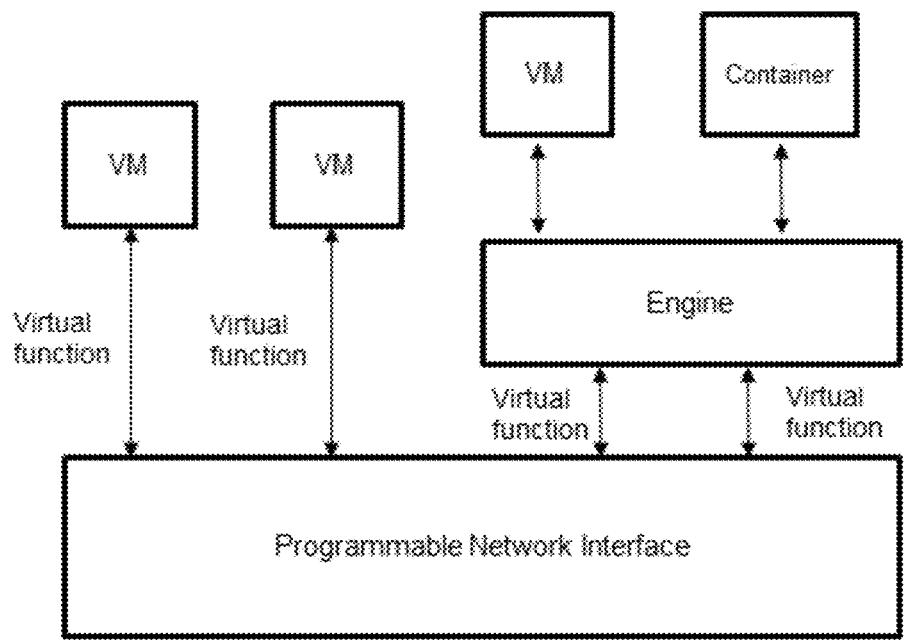

FIG. 9 schematically illustrates a programmable network interfaces with embedded switch as implemented in an embodiment of the NIC of the present invention.

Figure 10A:
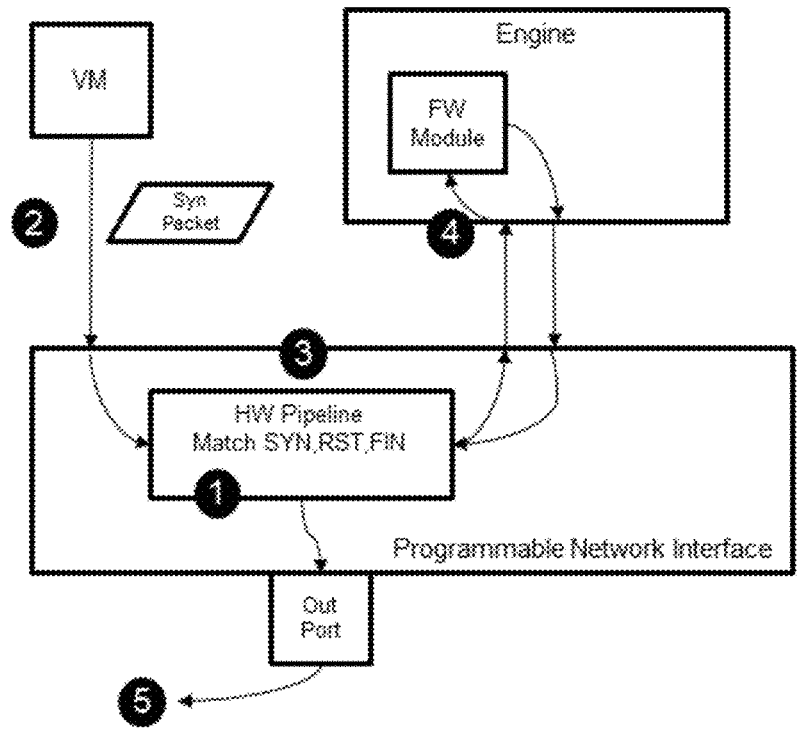
Figure 10B:
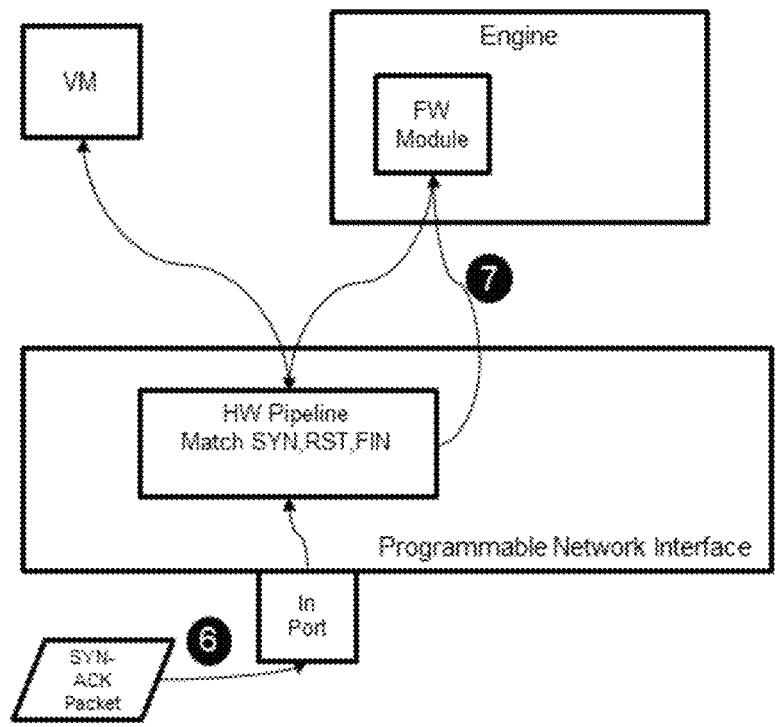
Figure 10C:
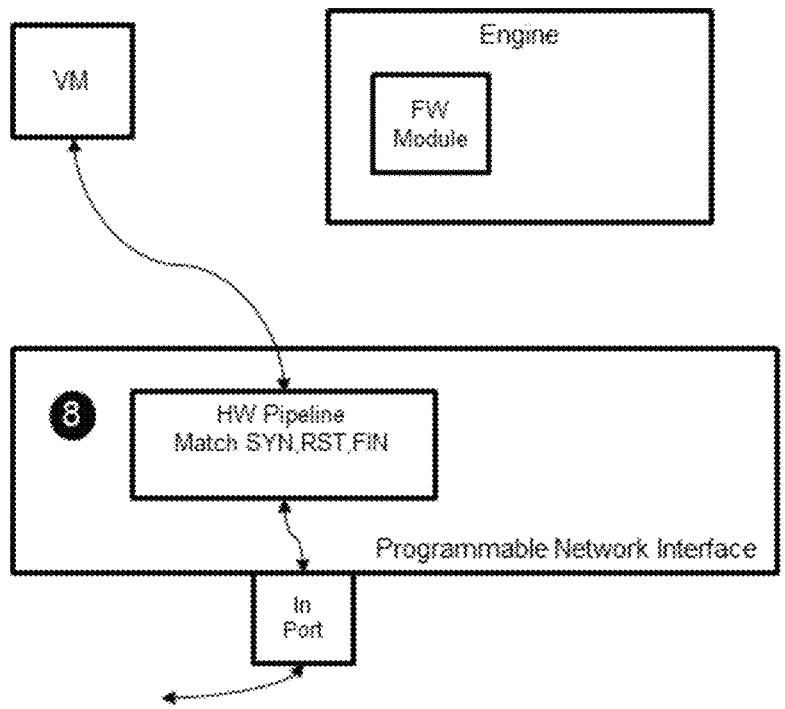

FIGS. 10A-C illustrate application of a firewall service to packet traffic by an embodiment of the NIC of the present invention.

Figure 11:
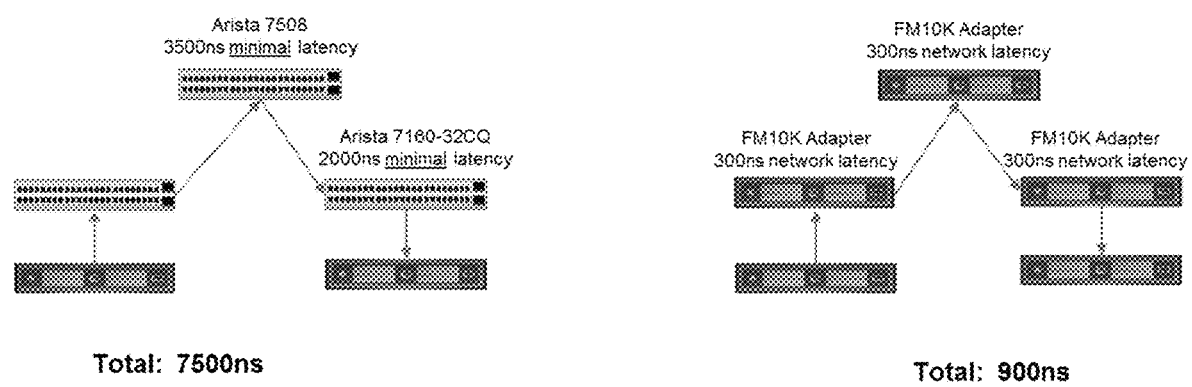

FIG. 11 illustrates a latency comparison.

DESCRIPTION OF SPECIFIC EMBODIMENTS OF THE INVENTION

Embodiments of the current invention recognize, current switches are limited by their 100 GB ports and thus cannot efficiently serve the increasing number of servers per rack, while 100 GPbs equipment is very expensive to implement.

In order to meet volume demands and minimize costs, hardware acceleration and redundancy are used in network routers and switches with quality of service (QoS) enabled by buffer queues inside the switch. The IP header packet is marked with a differentiated services code point (DSCP) number (or PBIT) that indicates the QoS level and ensures that the packet enters the correct queue according to its level. However, in virtualized environments where traffic is tunneled and the application headers are contained within an encapsulation header, distinguishing between various QoS levels is close to impossible.

Additionally, the layer 2 switch receives many packets from many different tenants and current methods and header field sizes are not sufficient to hold the packets from the different tenants and distinguish between different tenants and applications.

Embodiments of the present invention recognize, a new connectivity model for data centers which is structured as a physical distributed switch that is co-located at each server network interface controller (NIC).

Such a design addresses the challenges in networking large clusters while at the same time minimizes latency and hops and allows such clusters to conform to CLOS network topology standards. Embodiments of the present invention design bring the network closer to the application and allows the application to consume network resources in a way that is not available today.

The present invention is of hardware and software implementable in data center clusters. Specifically, the present invention can be used to provide connectivity and services in hyperscale data center topologies while minimizing latency, server hops, costs and power consumption.

The principles and operation of the present invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Embodiments of the current inventions recognize, currently used hardware and software solutions implementable in data center clusters are less than optimal for supporting hyperscale topologies. In addition, newer hardware solutions for addressing the limitations of outdated hardware is extremely expensive to implement in large scale topologies such as those used in data centers.

Some embodiments of the present invention can provide a solution for hyperscale topologies having performance and cost benefits especially in large scale deployments by:

(i) delivering 100-200 GBps traffic to one server/compute node without using 100 GB transceivers or 100 GB switches/routers that are limited by the number of ports per rack unit (port density);

(ii) reducing latency and traffic hops between two servers and enforcing QoS and service level agreement (SLA) policy between two virtualized end points;

(iii) delivering high end network services and virtual networking enforcement to single-root input/output virtualization (SR-IOV) or Bypass Virtual Machines by leveraging and complimenting local hardware capabilities using an efficient hybrid software solution; and (iv) simplifying management/operation/deployment of network services for east-west traffic (traffic flowing inside the data center) by using a single type networking device and "run anywhere" software solutions.

Some embodiments of the present invention include uniquely configured hardware devices and software modules for providing:

(i) a unique network interface card (MC) for enabling high speed communication of network traffic between hosts. Such an interface can be implemented as a 36 port PCIe card that can aggregately forward up to 200 GBps traffic to a host CPU;

(ii) configurable patch panel for optically interconnecting servers of different clusters;

(iii) unique network topology that leverages the capabilities of (i) and (ii) to interconnect a large number of servers (several thousands) with minimal latency and server hops; and (iv) software modules that work along with hardware (hybrid software-hardware approach) to enable efficient routing of packets and application of services.

Figure 1:
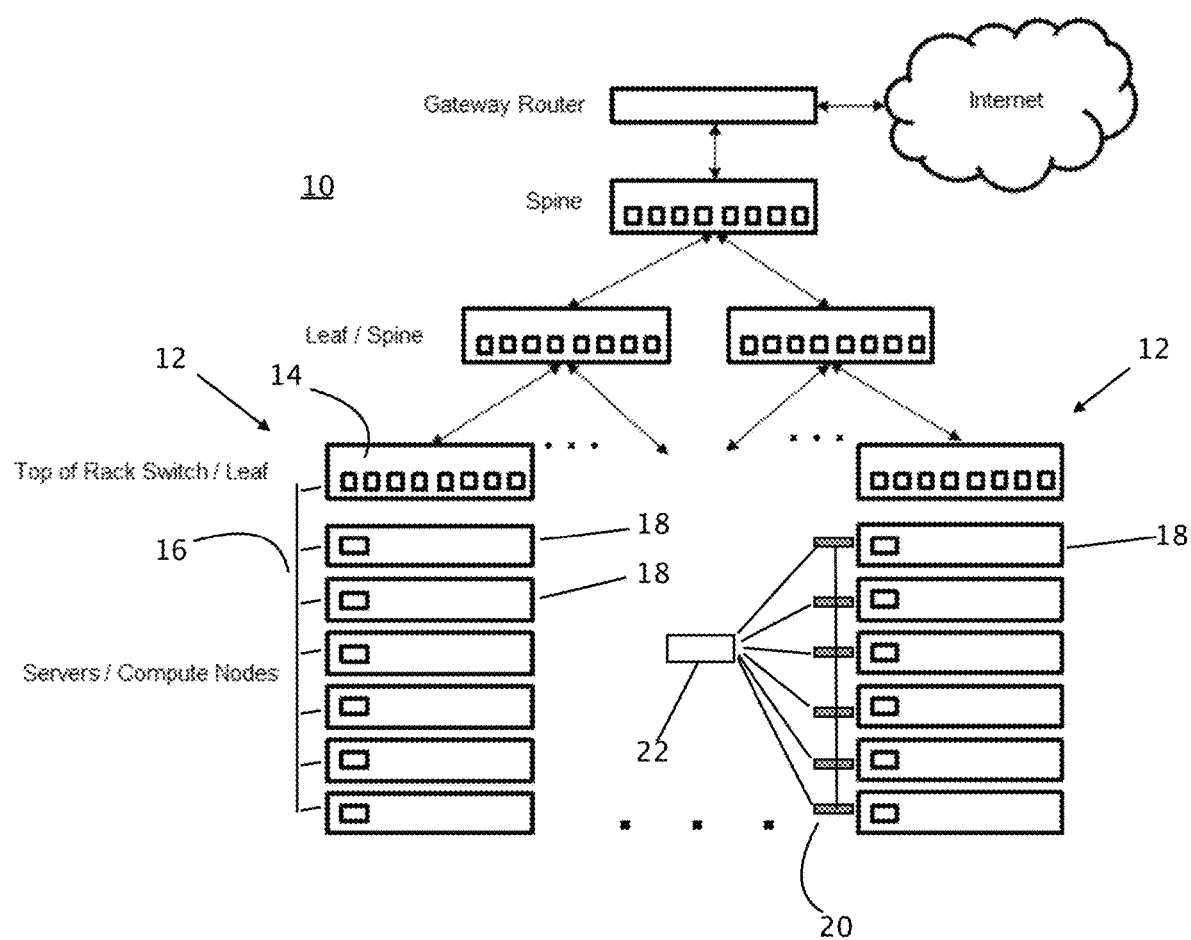

FIG. 1 displays a block diagram for a typical cluster 10 layout includes racks 12 a ToR switch 14 for each rack and interconnects 16 between the servers 18 of each rack. Additionally, FIG. 1 depicts one embodiment of the present invention that further includes a NIC card 20 for each server. NIC card 20 is used to interconnect servers of one rack and servers of other racks or clusters through the patch panel 22 of the present invention. NIC card 20 (as well as software modules controlled thereby) and Patch panel 22 as well as topologies enabled thereby are further described hereinunder.

Due to robust server to server interconnects enabled by the NIC card and patch panel described herein, the present invention can provide a topology that is adaptive to the current traffic and has much more bandwidth capacity and traffic routes between pairs of servers.

Figure 5A:
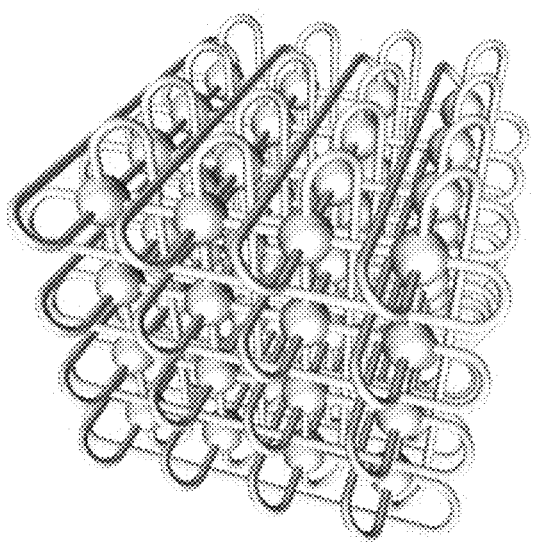
Figures 5B, 5C, 5D:
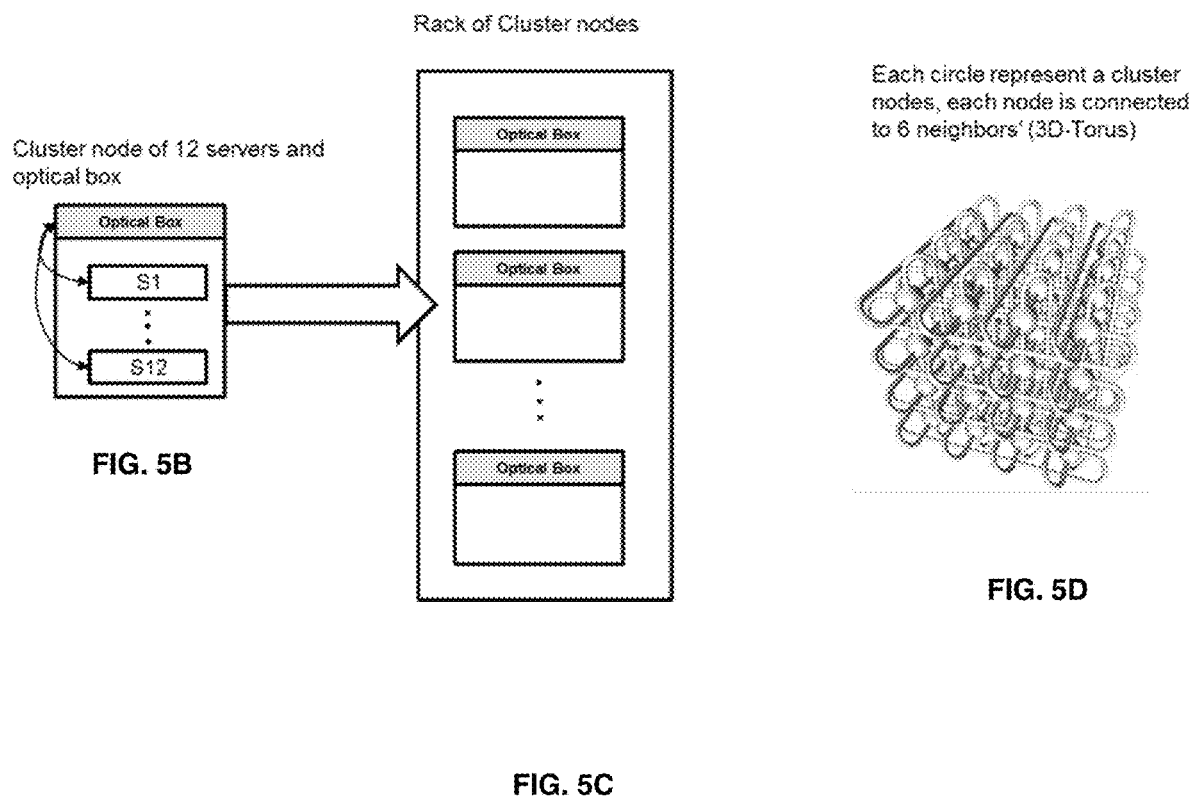

Referring to FIG. 5B, a packet destined to a server that is in the same cluster group as the source server can be transferred through a direct connection since the source and destination servers are neighbors and share a connection. If the connection is 'busy' another route can be selected using another neighbor thus creating a 2 hops route, for example:

(i) Server S1 wants to communicate with server S2 but the link between them is currently full;

(ii) Server S3 never talks with S1 and S2 so the links between S1 and S3 and S3 and S2 are not loaded; and (iii) Some traffic is routed from S1 to S3 (through a direct connection) and from there to S2.

Figure 3:
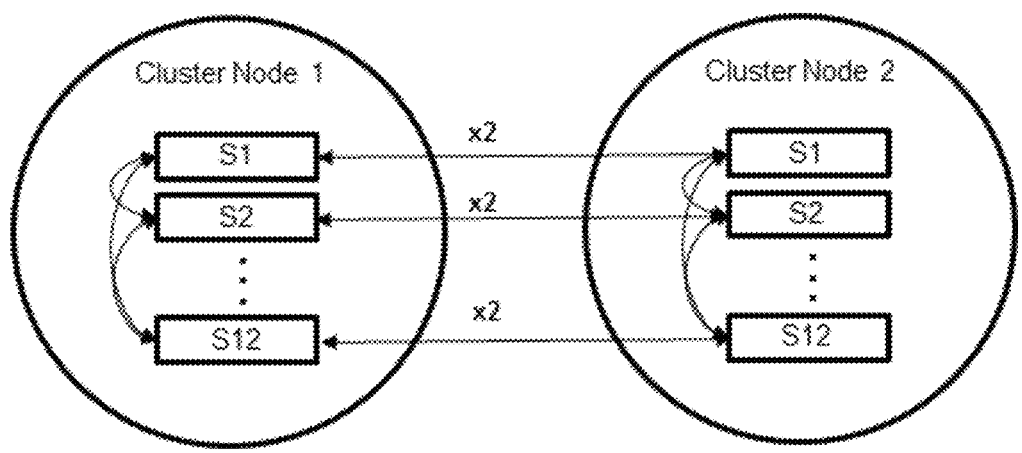

If the destination is on another cluster, the packet traverses the "high way" connection between clusters (see, for example, FIG. 3). The connection used for such packet transfer is dependent on a policy defined by the user (application priority, required bandwidth, required latency etc.) and the actual load and metrics on the connections at each link. Packet flow through standard topology (FIG. 1) will typically use the shortest path to a destination depending on which racks the source and destination exist.

As is mentioned hereinabove, the present invention includes a novel MC card for enabling interconnects between servers and services.

In some embodiments, the NIC can be a PCIe card with up to 36 external ports of 10-25 GB providing up to 200 GBps of traffic to a server CPU.

In order to process that much bandwidth inside a PCIe card with low power consumption, the NIC card can include a chip with an embedded 600 GBps processing smart switch and 4 Ethernet controllers. Alternative chip hardware with an optional "smart" embedded switch that supports acceleration or with field-programmable gate array (FPGA) or small CPU's that can processes traffic in high speeds can also be used by the NIC card.

The NIC card utilizes on board transceivers to provide external ports on the PCIe card. Some embodiments may include on board transceivers (OBTs) that support up to 12 lanes of 25 GB from FCI and other vendors.

Figure 2:
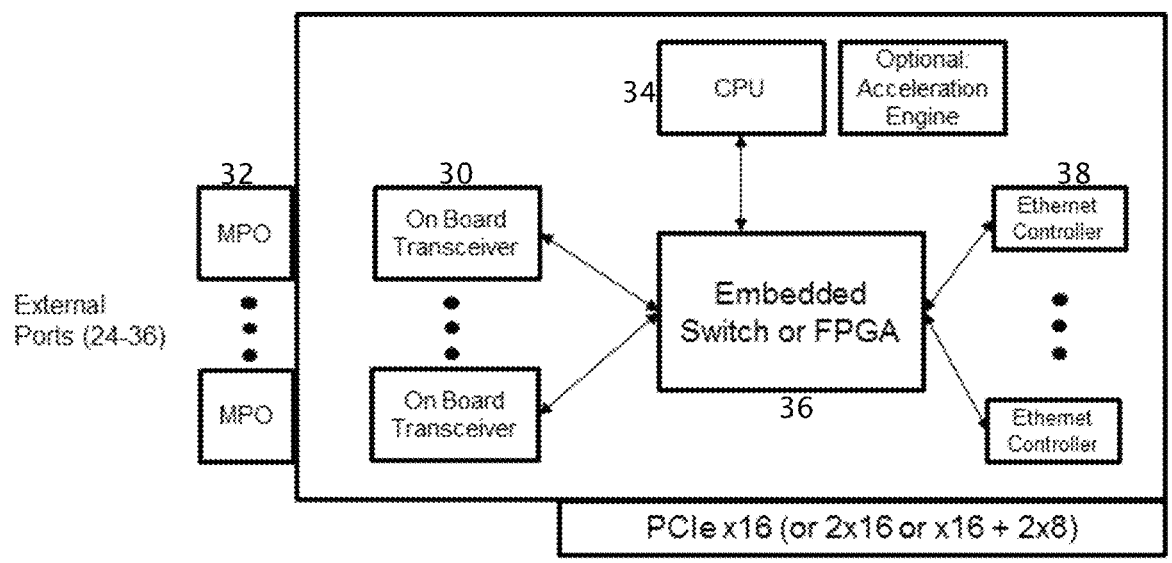

An example of such a NIC card, referred to herein as NIC card 20, is illustrated in FIG. 2. FIG. 2 is one embodiment of NIC card 20.

In one embodiment, NIC card 20 includes optical on board transceivers 30 of 12×25 GB each (24 channels in total—12 RX and 12 TX) connect to lines and act as the external ports.

In the depicted embodiment, NIC card 20 also includes MPOs 32 with dynamic cables, each connecting to one on board transceiver for an aggregate of 300 GB bandwidth, which can be split in few ways, (e.g., 3×100 GB or 12×25 GB etc.) and a CPU 34—an X86 computation unit or other programmable unit that can run generic code (for example ARM, XLP etc.). NIC card 20 also includes an embedded Switch/FPGA 36 with a programmable switching ASIC application-specific integrated circuit that supports traffic manipulation capabilities and large switching and an Ethernet Controller 38—ether controller that supports large PCIe speeds to CPU. In some embodiments, network interface and switching are incorporated together.

Presently used NICs and PCIe cards are limited in their switching capacity, such a limit is enforced by thermal conditions of the chip and size of a standard PCIe card. In an embodiment described herein, the NIC supports 600 GB of switching capacity and has up to 200 GB of PCIe bandwidth to the host. This enables use of 24 external ports of 25 GB to achieve dimensions of connectivity that do not exists in current hardware solutions.

The unique architecture and capabilities of NIC card 20 (exemplified above with 24 ports) enables the creation of unique interconnect topologies (server to server, in rack and between racks) that substantially reduce latency between any two compute nodes and enable great flexibility in bandwidth allocation and total switching capacity.

Some embodiments of such topologies can be constructed as follows:

(i) a mesh cluster of 12 nodes—an entire cluster can be used as a node by itself in a 3D-Torus 4×4×4 fabric (FIG. 3) with each cluster node having 12 servers, and each server (S1 . . . S12) connected to all other servers in the same node to build a full mesh connectivity.

Figure 4:
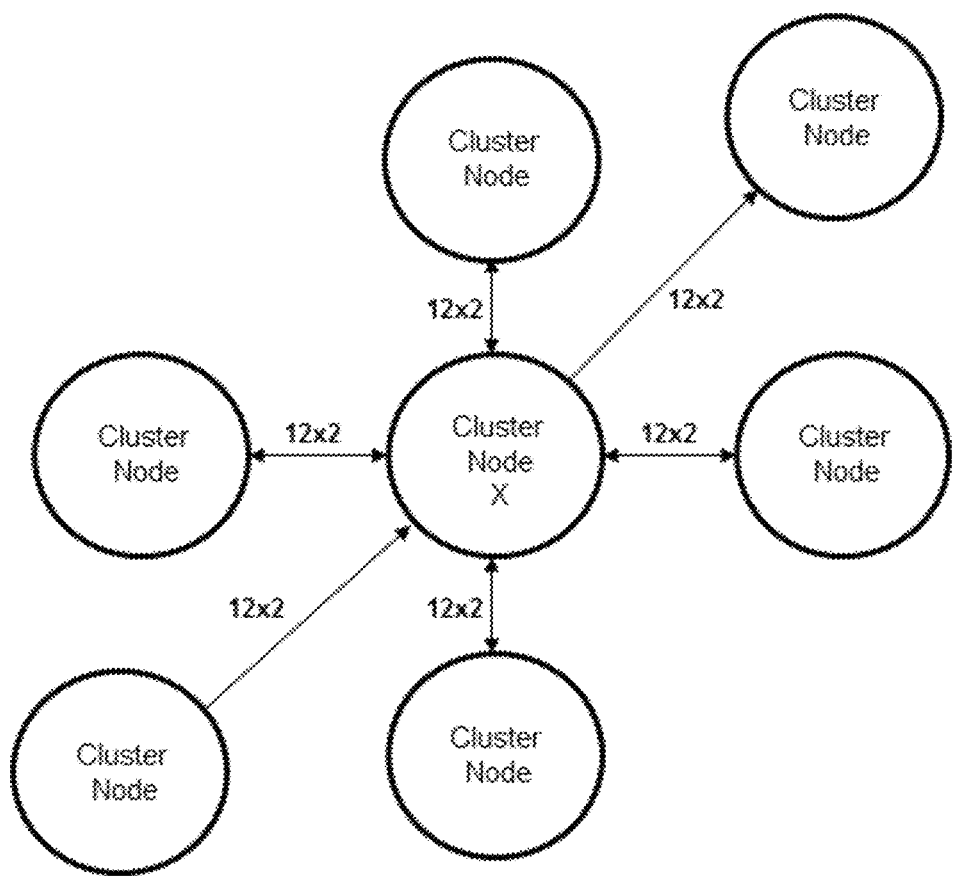

NIC card 20 provides each S1 . . . S12 with 12 additional links to servers on other clusters thus enabling the formation of the 4×4×4 3D Torus topology shown in FIG. 4.

Each cluster node is connected to 6 other cluster nodes (3D-Torus) through two links for each of the 12 ports thus providing 24 links between cluster to cluster.

FIG. 5A depicts a 3D-Torus of a 4×4×4 cluster nodes. Each cluster node includes 12 interconnected servers such that each server can reach any other server within the node via a single hop and any node can reach any other node through 3 hops. In such a setup, the 768 nodes of the 3D-torus can be interconnected through a maximum hop count of 4 hops between any two servers. This cluster can be extended by increasing the dimension of the outer 3D-Torus connectivity.

Figure 6:
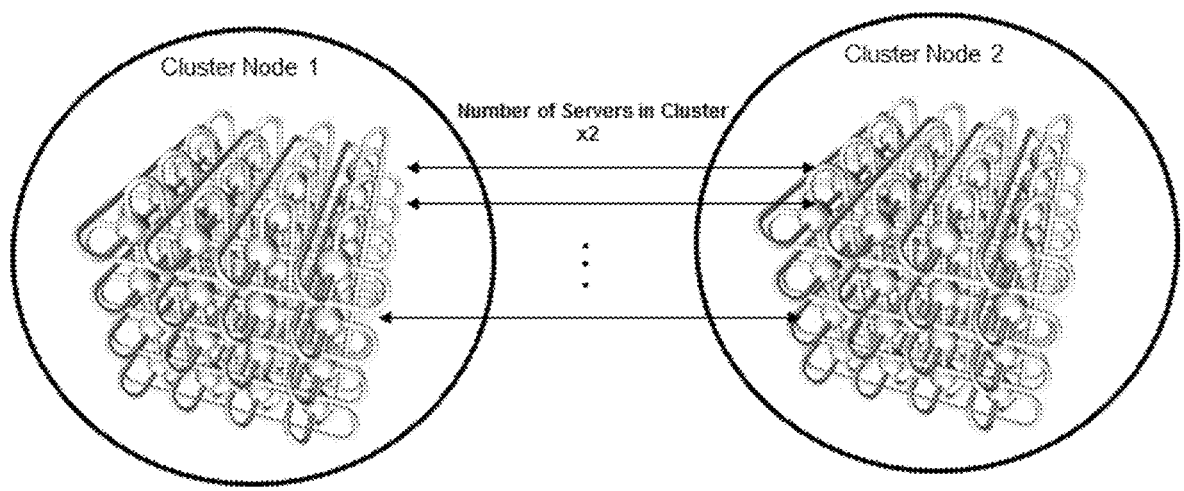

An alternative topology maintains the outer 3D Torus layer the same, including the connectivity between the cluster nodes but changes the way that nodes are connected inside the cluster (FIG. 6). In this topology, the nodes connected inside the cluster are also connected as a 3D Torus to form a nested 3D Torus connectivity.

The number of servers per cluster node can grow depending on the dimension of the 3D-Torus. The unique connectivity of the topologies described above delivers high switching fabric capacity and extreme low latency and thus improves on present day data center designs. Packets traversing the above described cluster(s) are routed using a dedicated routing platform that can be enhanced and plugged into the cloud/data center provider's orchestration and scheduling unit. The algorithm can be located on the CPU on the NIC card or can run on the server host and can be executed in a centralized location.

Current routing algorithms lack features needed to support the present cluster(s) topology (also referred to as 'fabric'). Protocols that can be used such as link state protocols (OSPF, ISIS) allow to define weights on the links but don't scale very well to big clusters and are thus very limited.

FIGS. 5B-D illustrates how interconnects are used to organize servers into racks (FIG. 5B) cluster nodes (FIG. 5C) and clusters (FIG. 5D). As is evident from FIGS. 5B-D (and FIGS. 5A and 6), the present cluster topology enables numerous paths from one server to another and as such, the overall switching capacity (lanes and maximum total bandwidth) is 12× higher than a standard topology. As such, presently used routing approaches would be incapable of calculating traffic paths and direct routing effectively and efficiently.

The following describes an embodiment of how the routing platform of the present system calculates traffic paths and routing in such a highly-connected cluster.

A system routing platform that is implemented in a distributed manner can be implemented on the CPU of the NIC (e.g. atom CPU). A core or centralized portion of this system communicates with the distributed portions (on NICs, described above) for updates by leveraging the management network or potentially the data network itself.

The routing platform first constructs a connectivity graph (map) for each node. Each node then reports to a centralized controller which builds the overall connectivity graph and synchronizes this information back to all the nodes. One important aspect of such connectivity is "locality"; a cloud orchestration system that is plugged into the connectivity graph can leverage locality to deploy workloads (VM's, applications, containers) that are close on the graph and can communicate with each other.

The present topology provides more paths between nodes and as such more bandwidth in the fabric as a whole. Such a topology allows building of more advanced and efficient scheduling systems that can schedule applications/VM's which often need to speak with each other on nodes that are directly connected or closely connected ("locality").

The present connectivity map can also be used to define more sophisticated scheduling policies defining how applications are connected across the data center.

The user of the present system can then define specific policies on top of the graph, for example define a dedicated path between application A and application B with specific service level agreements (SLAs) for this path (bandwidth, QoS, latency etc.). The centralized routing platform then compiles these policies into routing rules that are based on user-configured rules such that connectivity is balanced across the fabric in an optimized manner (using shortest path graph algorithms).

This enables reserving of specific connections for specific data such that an open connection is always available for such data and balancing the rest of the data across non-reserved connections.

Such traffic balancing is enabled by the present topology due to the increased bandwidth and connections provided thereby.

The present system utilizes traffic metrics from each of the nodes (the routing platform daemon on the servers) regarding latency, packet counters, drop counters, total bandwidth, queues and buffers sizes, round trip times between each two nodes from a specific node perspective etc., and adjusts the routing rules to converge into an optimal distribution trying to achieve a shortest path between any two nodes. These calculations also support backup routes in case of link failures. Link failures forces the system to use the backup routes and to recalculate the overall routing based on location of link failure and the above-mentioned logic.

The routing platform of the present invention can also be extended by abstracting the algorithms used on the network graph from the other parts of the platform allowing innovation of machine learning and AI based routing in the data center.

For example, a user of the present system can implement optimization algorithms on top of the graph and the traffic pattern to learn the communication patterns between nodes and relocate workloads to balance traffic.

Several common features that are crucial for any routing protocol/platform are implemented as micro services that exchange information and can be replaced and re-written in any language with any other logic.

Figure 7:
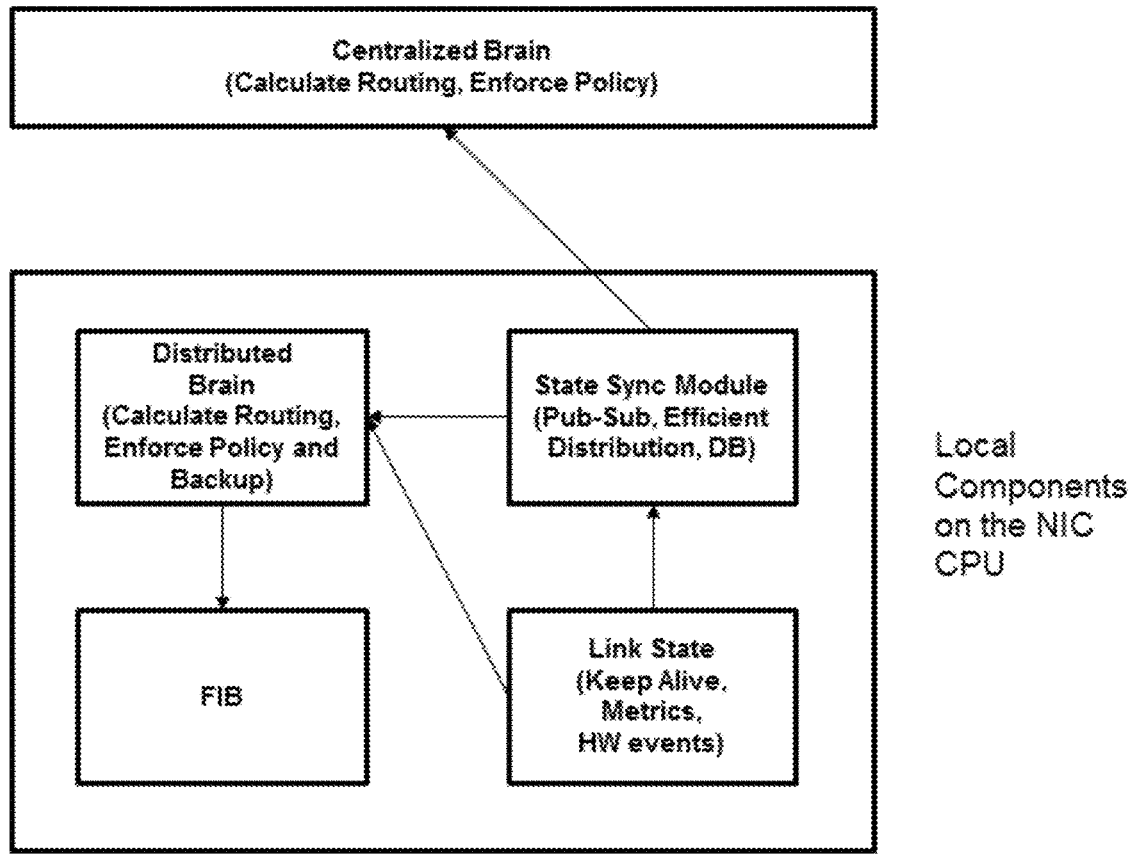
FIG. 7 illustrates an embodiment of the routing platform of the present invention.

An embodiment of the routing platform of the present invention is illustrated in FIG. 7. The host IP is configured into the algorithm and the routing platform will know to auto discover the topology between the hosts and the IP's as follows:

(i) Each server sends "Hello" messages to all its neighbors in a constant time interval such that each server identifies all of its connected neighbors;

(ii) Each server then synchronizes all the other servers with this information (leveraging distributed gossip like sync or using the centralized brain); and (iii) The centralized brain executes a routing algorithm on the topology graphs that have been received from all nodes and distributes the rules (and backup rules). It then calculates all the routes and backup routes from one location in the big pod (farm of servers and racks).

In order to provide rack to rack and cluster to cluster interconnects through NIC card 20, the present invention utilizes a patch panel including multi-fiber push on (MPO) connectors.

In an example, the MPO connector standard is defined by: IEC-61754-7 and EIA/TIA-604-5 (also known as FOCIS 5). MTP stands for "Multi-fiber Termination Push-on" connector and are built around the MT ferrule. An MTP connector is a high performance MPO connector designated for better mechanical and optical performance and is in complete compliance with all MPO connector standards. MPO/MTP is a technology deployed for multi-fiber application. The MPO/MTP connectors are manufactured specifically for multi-fiber ribbon cables. A single MPO/MTP connector is able to terminate the combination of 4, 8, 12, 24, 36, 64 fiber ribbon cables among which 12 and 24 are the most popular MPO/MTP connectors. The 24 ribbon represent a 12 port ribbon for Transmit(TX) and a 12 port ribbon for Receive (RX); the "ports" can be 10G or 25G.

In multi port interconnects of a large number of ports, it can be very challenging to wire the optical cables to form the complex multidimensional interconnect of the cluster. Embodiments of the present invention include a patch panel enclosure that simplifies cabling. This patch panel moves the complexity of wiring and the topology layout into the enclosure and thus enables pairing of any two MPO cables at the enclosure connectors.

The present patch panels includes a mechanism for switching interconnects between ports inside the enclosure thus allowing rapid and simple installation.

Thus, the present patch panel is in fact an optical port routing enclosure that includes a plurality of optical ports (MPOs) and a mechanism for optically coupling user selectable pairs of these optical ports. Each port pair is capable of connecting a first multi-pole optical cable (MPO cable, LC) to a second multi-pole optical cable with the connectable pair defined by the user deployable mechanism.

Examples of mechanisms for ribbon pairing include, but are not limited to, fanning out internally each MPO into 12 dual (RX/TX) fiber cables that connect through a panel-cassette system. The patch panel of the present invention can include several cassettes each having a different cabling scheme and the user can then switch cassettes according to the topology desired.

Alternatively, a flex optical circuit can be used. Optical flex circuitry is designed to optimize complex fiber optic layouts with extremely high fiber count, providing system designers with real solutions to growing fiber management problems.

Alternatively, a remotely programmable optical chip can be used to selectively and optically couple connectors. Such a configuration is shown in FIG. 8B.

Examples of an inter-enclosure connectivity scheme are provided in Tables 1-3 below. In such schemes, 12 physical server that have 24 ports each are connected in mesh using the first 11 ports (of the NIC card) creating the node cluster base group of 12 server connected via one hop, the 12 ports on each sever will be used to external connectivity from the cluster and connected to the external networks. The remaining 6 ports on each server creates 3D torus to the neighbor's node clusters (each one include 12 servers) through patch panel connections. This nested topology represents an inner mesh topology and outer 3D torus. The size of the external 3D torus matrix will define how many servers will be connected in this exemplary topology, for example a 4×4×4 3D torus of the cluster node can connect 768 (4×4×4×12) servers with a maximum of 4 hops for the shortest path possible between any two servers.

Thus, the present patch panel is a user configurable and adjustable port to port interconnect allowing the user to modify the physical topology of server to server interconnects by modifying MPO-to-MPO interconnects within the enclosure.

Figure 8A:
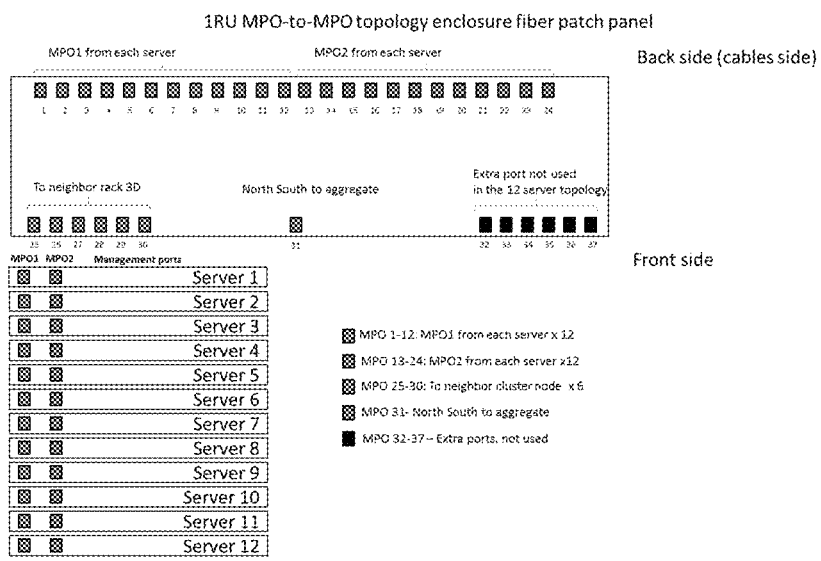
FIG. 8A illustrates a port layout of a back panel of an embodiment of the present patch panel and an interconnect scheme supported thereby.
Figure 8B:
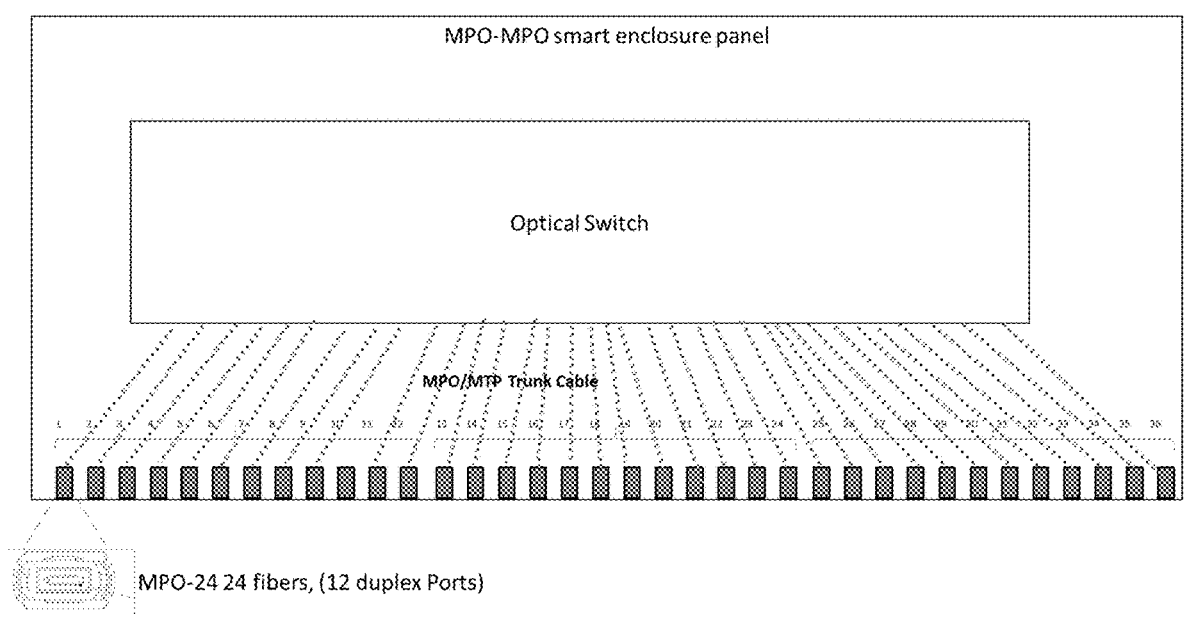
FIG. 8B illustrates optical switching within a patch panel of the present invention.

FIG. 8A illustrates an exemplary MPO-to-MPO enclosure connecting 12 servers with each server having 24 ports. Thus, in total, the present enclosure connects 12×24=288 ports in a 1RU form factor.

As is shown in FIG. 8A, MPOs 1 (marked as MPO 1 from each server) are interconnected in a mesh network using the first 11 ports out of the 12 available on an MPO, creating a full mesh for the 12 servers. The 12th port of each MPO is used to connect to external connectivity—out of the POD or to the internet. Port 31 (FIGS. 8A-B) is an MPO with 12×25G Rx/TX optic cables that is connectable to the POD Router/Switch through a 12×25 or 3×100 300G connection. Internally, the patch panel connects each of the 12 ports to each of the server ports allowing each server to have a 25G external direct connectivity.

The matrix of Table 1 below describes this connectivity.

TABLE 1

| | \multicolumn{7}{c}{MPO-1 from all servers} |
|---|---|---|---|---|---|---|---|
| | MP0-1 | MP0-2 | MP0-3 | MP0-4 | MP0-5 | MP0-6 | MP0-7 |
| Port 1 | MPO2, 1 | MPO1, 1 | MPO1, 2 | MPO1, 3 | MPO1, 4 | MPO1, 5 | MPO1, 6 |
| Port 2 | MPO3, 1 | MPO3, 2 | MPO2, 2 | MPO2, 3 | MPO2, 4 | MPO2, 5 | MPO2, 6 |
| Port 3 | MPO4, 1 | MPO4, 2 | MPO4, 3 | MPO3, 3 | MPO3, 4 | MPO3, 5 | MPO3, 6 |
| Port 4 | MPO5, 1 | MPO5, 2 | MPO5, 3 | MPO5, 4 | MPO4, 4 | MPO4, 5 | MPO4, 6 |
| Port 5 | MPO6, 1 | MPO6, 2 | MPO6, 3 | MPO6, 4 | MPO6, 5 | MPO5, 5 | MPO5, 6 |
| Port 6 | MPO7, 1 | MPO7, 2 | MPO7, 3 | MPO7, 4 | MPO7, 5 | MPO7, 6 | MPO6, 6 |
| Port 7 | MPO8, 1 | MPO8, 2 | MPO8, 3 | MPO8, 4 | MPO8, 5 | MPO8, 6 | MPO8, 7 |
| Port 8 | MPO9, 1 | MPO9, 2 | MPO9, 3 | MPO9, 4 | MPO9, 5 | MPO9, 6 | MPO9, 7 |
| Port 9 | MPO10, 1 | MPO10, 2 | MPO10, 3 | MPO10, 4 | MPO10, 5 | MPO10, 6 | MPO10, 7 |
| Port 10 | MPO11, 1 | MPO11, 2 | MPO11, 3 | MPO11, 4 | MPO11, 5 | MPO11, 6 | MPO11, 7 |
| Port 11 | MPO12, 1 | MPO12, 2 | MPO12, 3 | MPO12, 4 | MPO12, 5 | MPO12, 6 | MPO12, 7 |
| Port 12 | MPO31, 1 | MPO31, 2 | MPO31, 3 | MPO31, 4 | MPO31, 5 | MPO31, 6 | MPO31, 7 |

| | \multicolumn{5}{c}{MPO-1 from all servers} |
|---|---|---|---|---|---|
| | MP0-8 | MP0-9 | MP0-10 | MP0-11 | MP0-12 |
| Port 1 | MPO1, 7 | MPO1, 8 | MPO1, 9 | MPO1, 10 | MPO1, 11 |
| Port 2 | MPO2, 7 | MPO2, 8 | MPO2, 9 | MPO2, 10 | MPO2, 11 |
| Port 3 | MPO3, 7 | MPO3, 8 | MPO3, 9 | MPO3, 10 | MPO3, 11 |
| Port 4 | MPO4, 7 | MPO4, 8 | MPO4, 9 | MPO4, 10 | MPO4, 11 |
| Port 5 | MPO5, 7 | MPO5, 8 | MPO5, 9 | MPO5, 10 | MPO5, 11 |
| Port 6 | MPO6, 7 | MPO6, 8 | MPO6, 9 | MPO6, 10 | MPO6, 11 |
| Port 7 | MPO7, 7 | MPO7, 8 | MPO7, 9 | MPO7, 10 | MPO7, 11 |
| Port 8 | MPO9, 8 | MPO8, 8 | MPO8, 9 | MPO8, 10 | MPO8, 11 |
| Port 9 | MPO10, 8 | MPO10, 9 | MPO9, 9 | MPO9, 10 | MPO9, 11 |
| Port 10 | MPO11, 8 | MPO11, 9 | MPO11, 10 | MPO10, 10 | MPO10, 11 |
| Port 11 | MPO12, 8 | MPO12, 9 | MPO12, 10 | MPO12, 10 | MPO11, 11 |
| Port 12 | MPO31, 8 | MPO31, 9 | MPO31, 10 | MPO31, 11 | MPO31, 12 |

The scheme shown in Table 1 connects 12 physical servers MPO 1 (FIGS. 8A-B) each including 12 full duplex LC's ports. Each MPO of each server utilizes its first 11 ports to create a mesh interconnect (all 12 servers are connected directly to each other) creating a 12 server node cluster with each server pair connected via one hop. The 12 ports on each server MPO 1 will be used to external connectivity from the cluster and connected to the external networks through MPO 31.

TABLE 2

| | \multicolumn{6}{c}{MPO-2 from all servers} |
|---|---|---|---|---|---|---|
| | MP0-13 | MP0-14 | MP0-15 | MP0-16 | MP0-17 | MP0-18 |
| Port 1 | MPO25, 1 | MPO25, 2 | MPO25, 3 | MPO25, 4 | MPO25, 5 | MPO25, 6 |
| Port 2 | MPO26, 1 | MPO26, 2 | MPO26, 3 | MPO26, 4 | MPO26, 5 | MPO26, 6 |
| Port 3 | MPO27, 1 | MPO27, 2 | MPO27, 3 | MPO27, 4 | MPO27, 5 | MPO27, 6 |
| Port 4 | MPO28, 1 | MPO28, 2 | MPO28, 3 | MPO28, 4 | MPO28, 5 | MPO28, 6 |
| Port 5 | MPO29, 1 | MPO29, 2 | MPO29, 3 | MPO29, 4 | MPO29, 5 | MPO29, 6 |
| Port 6 | MPO30, 1 | MPO30, 2 | MPO30, 3 | MPO30, 4 | MPO30, 5 | MPO30, 6 |
| Port 7 | | | | | | |
| Port 8 | | | | | | |
| Port 9 | | | | | | |
| Port 10 | | | | | | |
| Port 11 | | | | | | |
| Port 12 | | | | | | |

| | \multicolumn{6}{c}{MPO-2 from all servers} |
|---|---|---|---|---|---|---|
| | MP0-19 | MP0-20 | MP0-21 | MP0-22 | MP0-23 | MP0-24 |
| Port 1 | MPO25, 7 | MPO25, 8 | MPO25, 9 | MPO25, 10 | MPO25, 11 | MPO25, 12 |
| Port 2 | MPO26, 7 | MPO26, 8 | MPO26, 9 | MPO26, 10 | MPO26, 11 | MPO26, 12 |
| Port 3 | MPO27, 7 | MPO27, 8 | MPO27, 9 | MPO27, 10 | MPO27, 11 | MPO27, 12 |
| Port 4 | MPO28, 7 | MPO28, 8 | MPO28, 9 | MPO28, 10 | MPO28, 11 | MPO28, 12 |
| Port 5 | MPO29, 7 | MPO29, 8 | MPO29, 9 | MPO29, 10 | MPO29, 11 | MPO29, 12 |
| Port 6 | MPO30, 7 | MPO30, 8 | MPO30, 9 | MPO30, 10 | MPO30, 11 | MPO30, 12 |
| Port 7 | | | | | | |
| Port 8 | | | | | | |
| Port 9 | | | | | | |
| Port 10 | | | | | | |
| Port 11 | | | | | | |
| Port 12 | | | | | | |

The scheme of Table 2 connects twelve physical servers MPOs 2 (FIGS. 8A-B MPO 2 from each server) which include twelve full duplex LC ports, each server MPO 2 uses its first 6 ports to creates a 3D torus to the neighbor's node clusters (clusters are 12 server each). The remaining 6 ports on MPO 2 from each server are unused in this example topology layout.

TABLE 3

|  | To neighbor's node clusters | | | | | | External N/S |
| --- | --- | --- | --- | --- | --- | --- | --- |
|  | MP0-25 | MP0-26 | MP0-27 | MP0-28 | MP0-29 | MP0-30 | MP0-31 |
| Port 1  | MPO13, 1 | MPO13, 2 | MPO13, 3 | MPO13, 4 | MPO13, 5 | MPO13, 6 | MPO1, 12 |
| Port 2  | MPO14, 1 | MPO14, 2 | MPO14, 3 | MPO14, 4 | MPO14, 5 | MPO14, 6 | MPO2, 12 |
| Port 3  | MPO15, 1 | MPO15, 2 | MPO15, 3 | MPO15, 4 | MPO15, 5 | MPO15, 6 | MPO3, 12 |
| Port 4  | MPO16, 1 | MPO16, 2 | MPO16, 3 | MPO16, 4 | MPO16, 5 | MPO16, 6 | MPO4, 12 |
| Port 5  | MPO17, 1 | MPO17, 2 | MPO17, 3 | MPO17, 4 | MPO17, 5 | MPO17, 6 | MPO5, 12 |
| Port 6  | MPO18, 1 | MPO18, 2 | MPO18, 3 | MPO18, 4 | MPO18, 5 | MPO18, 6 | MPO6, 12 |
| Port 7  | MPO19, 1 | MPO19, 2 | MPO19, 3 | MPO19, 4 | MPO19, 5 | MPO19, 6 | MPO7, 12 |
| Port 8  | MPO20, 1 | MPO20, 2 | MPO20, 3 | MPO20, 4 | MPO20, 5 | MPO20, 6 | MPO8, 12 |
| Port 9  | MPO21, 1 | MPO21, 2 | MPO21, 3 | MPO21, 4 | MPO21, 5 | MPO21, 6 | MPO9, 12 |
| Port 10 | MPO22, 1 | MPO22, 2 | MPO22, 3 | MPO22, 4 | MPO22, 5 | MPO22, 6 | MPO10, 12 |
| Port 11 | MPO23, 1 | MPO23, 2 | MPO23, 3 | MPO23, 4 | MPO23, 5 | MPO23, 6 | MPO11, 12 |
| Port 12 | MPO24, 1 | MPO24, 2 | MPO24, 3 | MPO24, 4 | MPO24, 5 | MPO24, 6 | MPO12, 12 |

The scheme shown in Table 3 describes the connectivity from the MPOs connected to the neighbor's node clusters in 3D Torus, MPO 25, 26, 27, 28, 29, 30 which will be connected to the neighbor's node clusters enclosure patch panels. The above connectivity example creates 12 servers connected in a mesh (termed "mesh cluster") and using the additional 6 ports from each server on MPO 2 to create a 3d Torus with neighbor's mesh clusters. MPO 31 is connected to the external network (e.g. Internet).

In FIG. 7 there are additional 6 MPOs that are unused in this topology and can connect the extra unused ports from Table 2. Thus, use of the present user-configurable patch panel moves the wiring complexity into the MPO-to-MPO enclosure (patch panel) allowing the end user to provide server to server interconnects in a manner simpler than CLOS or fat tree topologies while also enabling user modifications to a physical complex topology by just reconfiguring interconnects within the enclosure patch panel or by replacing the enclosure.

As is mentioned hereinabove, the present invention also enables provision of services at the server/VM level by employing software modules that can handle packet traffic to and from VMs.

SR-IOV is a technology that lets virtual machines connect directly to the network interface buffers and eliminate the overhead of traffic passing in the hosting server network stack and hypervisor.

There are other technologies that allow direct connectivity and eliminate overhead layers between the NIC and the end point (virtual machine, container).

These technologies are becoming more common in data centers and edge environments as virtual machines provide network services with strict latency and performance requirements. However, operators and users still want to apply tenant routing, security load balancing and additional functions in an infrastructure that connects VM's (or virtual appliances).

The following describes how such services are applied in SR-IOV environments by leveraging the dedicated software, connectivity and hardware provided by the present invention.

The new service pipeline paradigm of the present invention utilizes interconnected HW and SW pipelines that enable application of virtual services to packets from a user workload (from the VM or container). The SW engine can apply the services in a bump in the wire methodology and can modify the HW pipeline in a reactive fashion depending on the overall number of flows, the HW capability and other requirements.

Services provided by the present invention enable TCP session establishment and application of stateful security rules that are not supported by the HW by sending session establishment and teardown packets to the SW engine of the present invention (described in detail below). The SW module for session establishment is valid and does not present any threat to anti-spoofing mechanism present in a packet pipeline. Anti-spoofing mechanism do not allow VMs to assume an IP or MAC identifier different than that provided by the service provider. Thus, in prior art systems, any traffic from a VM with a different MAC or IP will be dropped.

FIG. 9 illustrates an embodiment of a typical deployment of the network interface card of the present invention in a server. This figure shows a programmable MC that provides server virtual functions (SR-IOV devices to host applications).

The user can attach virtual machines or containers directly to these virtual functions and also attach one or more of the virtual functions to an engine that provides a set of services (described below). The user can potentially also connect VM's or containers to the engine.

Services that can be provided by the engine include, but are not limited to, virtual routing, virtual networking/switching, tunneling, state full Security (NGFW), NAT, load Balancing, DPI, monitoring and service discovery.

FIGS. 10A-C illustrate embodiments of how the network interface card of the present invention can be configured to provide state full firewall inspection capabilities.

Programmable network interfaces with embedded switch do not support stateful firewall (FW) inspection capabilities but rather support ACL list (static rules that block/permit a certain traffic) and are unable to perform connection tracking which is a vital component for provision of state full services.

More sophisticated firewall functions like DPI, often termed "next generation firewall", can in theory provide stateful FW functions but is limited by resource and memory capacity and thus is limited by the number of rules or flows that can be handled.

The present network interface card can provide the functionality listed above while enabling direct connection between the VM's and NIC.

The NIC operates a FW software module (engine) which runs on the server and acts like a VM with several virtual function ports connecting it to the NIC. The module is configured with a known RPC API that lets the user add and delete rules as needed, the engine support an API to load/unload modules (like the FW) and adds them to a "service pipeline" which is a chain of all the services packets traverse.

FIGS. 10A-C illustrate how the FW software module enabled by the present NIC functions in this environment.

As is shown in FIG. 10A, the engine installs a rule in the programmable NIC to route all data packets having session initiation TCP flags (SYN, RST, FIN) to the engine (1). The VM's or containers that initiated the TCP connection (or closed it) are directly attached to the NIC (via a virtual function) and not to the engine itself, hence a rule is needed to direct all this traffic to the virtual function that the engine is connected on.

A local VM tries to open a TCP connection by sending a SYN packet (2). The packet hits the rules mentioned above and is directed to the engine (3). The engine enforces the FW rules, adds the flow connection to its memory tables and resends the packet to the NIC (4). The NIC transmits the packet to its destination (5).

As is shown in FIG. 10B, the destination sends a SYN-ACK reply that triggers a rule in the NIC and is routed back to the engine (6). The engine accesses the tables, finds the connection it added in 4 (FIG. 10A) and lets the traffic pass to destination (7).

Following this process, and as is shown in FIG. 10C, the rest of the packet traffic flows directly to and from the NIC with no need to pass through the engine (8) although a small percentage of the traffic can be randomly routed to the FW to keep track of different counters. When FIN or RST are retrieved, the engine receives them and deletes the entry from its tables (9).

The engine triggers a timer for each flow to ascertain that connections that stopped flowing are deleted from the memory tables. In order to understand the last time that a certain data from a connection was seen, the engine can configure the programmable NIC to match flow and count. This helps the engine verify that a certain connection is really closed and avoid deletion of open connections from memory.

The programmable NIC can be used to handle acknowledgments (ACKs) and random enforcements. The above functions as a probable defender and depending on the user it can be modified to, for example, increase security.

In addition to the start and end of connections the engine can also keep track of all the ACKs. This enables the engine to also track sequence numbering and avoid RST and FIN attacks (attacker trying to spoof and close other connections that are open) or a connection hijack/injection attacks.

It should be noted that these attacks are most likely not relevant for data flowing inside the data center (east-west traffic) as spoofing IP address for the VM's/containers should be blocked completely.

In presently used virtualized data centers where there are many tenants that share the same physical network and can create virtual networks and route traffic from VM's at one virtual network to another, a solution needs to be presented to isolate one tenant traffic from another.

In order to achieve this, the user data packet is encapsulated with a tunneling header (for example VXLAN) that distinguishes between the virtual and physical IP's and indicates the tenant or virtual network identity. A networking infrastructure needs to understand the destination host where a VM exists and encapsulate the traffic.

In some embodiments, the NIC of the present invention supports encapsulating and adding a header to a packet however, tables that hold these rules are limited in size and not flexible enough to distinguish between different customers (server tenants).

The present engine utilizes a hybrid approach where the engine installs the expected most loaded flows to the NIC but also creates several default rules that route unmatched traffic to the engine itself.

The engine mimics NIC functionality (virtual routing and encapsulation) in software and returns the traffic to the NIC pipeline. The hardware is aware that this traffic was already handled by the software engine and sends the traffic to the correct destination.

The engine can poll the hardware statistics and the software CPU load to determine if the rules in hardware should be changed and acts accordingly.

Network address translation (NAT) is a translation between a group of IPs to another IP or group of IPs, for example, all IP's 10.0.0.1-10.0.0.5 translate to external IP 192.168.1.1, the NAT module uses SRC UDP/TCP ports to distinguish between the packets coming back.

The following exemplifies NAT function using the present engine:

(i) Compute A with IP 10.0.0.1 sends a packet to 8.8.8.8 with TCP SRC port=50, DST port=80;

(ii) The NAT module receives the packet changes the SRC IP from 10.0.0.1 to 192.168.1.1 and assigns a SRC port=100 (changes 50 to 100 );

(iii) The NAT module then sends the packet back to destination. (8.8.8.8); and (iv) When packet is received from SRC IP=8.8.8.8 and DST IP=192.168.1.1 (the reverse flow) the NAT module check that the DST port is 100 and knows to replace the port back to 50 and the IP back to 10.0.0.1 (using a mapping table it maintains).

The NAT module of the present engine receives packets that don't have any mapping in hardware, determines a free port from an allocation of ports and configures the hardware with the mapping rule. The next packet of the same flow will hit the flow in hardware, will perform the mapping actions and thus would not need to pass through the software engine again.

The NAT module is dynamically configured with a policy that indicates how much resource the NAT module can use from the HW and when resource limits are reached the NAT module can utilize the software engine. A controller that monitors all the above-mentioned services splits the HW resources between all services/modules and aggregates learned information to understand if resource allocation should be changed.

Network security inside a data center is usually carried out by leveraging ACL/Security group rules that define what kind of traffic can flow between different end points (VM's, containers, servers)

For example, in a case where a VM1 with IP 10.0.0.1 wants to communicate with VM2 with IP 10.0.0.2 the user defines a rule that allows VM1 to communicate with IP 10.0.0.2. This rule can later be generalized to subnets/ports to indicate specific applications (like TCP/UDP) or anything that can be used to classify the packet headers.

Such a prior art approach is limited in as far as performance since rules needs to be checked for every packet. In addition, it is difficult to manage and synchronize all nodes with these rules and information and since IP's and other header fields can change (due to processing on another service) it makes it hard to track which rules to configure in order to allow a certain policy. Such an approach is thus difficult to implement and error prone. Finally, in the case of a compromised host, packet headers like IP can be spoofed and the attacker can potentially connect to any location in the infrastructure.

Embodiments of the present invention recognize advantages for defining security between applications which includes signatures (cookie certificates or cookies) that are injected into the connection establishment packet and are verified by the receiving side.

The flow of data in the approach of the present invention is as follows:

(i) a connection is opened from VM-A to VM-B;

(ii) the engine installs hardware rules that send any SYN packet to the engine;

(iii) the engine injects a signed cookie on the packet (in the data area) which is representing a specific policy group, or just the VM itself;

(iv) the local server engine only has cookies in its local cache that are depending on the local VM's/containers and is not updated with other cookies in the system;

(v) the receiving side receives the packet in hardware, recognize it is a SYN packet and sends it to the engine;

(vi) the engine examines the cookie and verifies that it matches the same policy of the receiving VM;

(vii) the engine then sends the packet to the original destination; and (viii) once this connection is approved, communication flows normally without going through the engine.

This approach is advantageous in that:

(i) IP's and header security is greatly simplified, the admin can just specify which applications can speak with others;

(ii) compromised hosts/machines can only communicate and spoof cookies they know internally and hence can actually only speak with destinations that they could previously speak with; and (iii) rules matching and performance is reduced.

As used herein the term "about" refers to ±10%.

Additional objects, advantages, and novel features of the present invention will become apparent to one ordinarily skilled in the art upon examination of the following example, which is not intended to be limiting.

EXAMPLES

Reference is now made to the following examples, which together with the above descriptions, illustrate the invention in a non limiting fashion.

Capacity Increase Benchmarking

A basic virtual Infrastructure in DC (IaaS) constructed using the teachings of the present invention was benchmarked. The infrastructure included Virtual Network, Virtual routing stateful security groups and Tunneling encapsulation for VM's.

The benchmarking was done on a dual socket E5-2690v4 (14 cores) Total: 28 cores using the 100G network adapter from the FM10K family.

The benchmark numbers were compared to the best publically available benchmark. From available public benchmarks, the present inventors concluded that 14 cores (each CPU core handling 3-8 Gbps, assuming above average of 7 Gbps) will be required in order to provide virtual routing, virtual network, stateful security groups and VxLan tunnel encapsulation (services for 100G bandwidth) in software using OVS-DPDK.

The benchmarks show that the present invention can provide 100G of the described virtual services using a single core (instead of 14 needed with prior art solutions), thus freeing 13 cores to the user workload.

The present invention also doubles the server capacity, and allows for DC operator to double their ROI from the same servers.

FIG. 11 illustrates the latency achieved using the topologies and NIC described herein (right panel) as compared with a current CLOS interconnect (left panel).

In the CLOS topology, 2 servers on different racks will have a minimal latency of 7500 ns port to port, accounting for a minimal ToR latency of 2000 ns on each rack and aggregate Router latency of 3500 ns.

In the case of the direct interconnect enabled by the present invention (NIC and patch panel) and a server to server link through a 3 server connection (4 hops) a latency of 900 ns port to port was achieved.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, web pages, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A network interface card (NIC), comprising:
a programmable switching ASIC (application-specific integrated circuit),
wherein the switching ASIC functions as a switch that manipulates data traffic within the NIC,
wherein the NIC is configured to route a Synchronize (SYN) packet to a destination virtual machine (VM) and to return the SYN packet to a first software engine,
wherein the NIC operates a software engine configured to: (i) install rules that route the SYN packet from a source VM through the software engine, (ii) append a signed cookie to the SYN packet, (iii) verify that a policy represented by the signed cookie appended to the SYN packet matches a policy of a destination VM, and (iv) return the SYN packet to the source VM which establishes a connection between the source VM and the destination VM, and
wherein verification that the policy represented by the signed cookie appended to the SYN packet matches the policy of the destination VM occurs after: the SYN packet with the appended cookie (i) is routed by the NIC to the destination VM, (ii) examined in hardware of the destination VM, and (iii) returned by the NIC to the software engine.

2. The NIC of claim 1, wherein the software engine is external to, and is directly connected to, the NIC.

3. The NIC of claim 1, wherein the source VM is a server and the destination VM is a client.

4. The NIC of claim 1, wherein the NIC comprises a peripheral component interconnect express (PCIe) card.

5. The NIC of claim 4, wherein the PCIe card comprises up to 36 external ports configured to handle 10 to 25 GB of data providing a maximum of 200 GB/sec of traffic to a server central processing unit (CPU) in a server.

6. The NIC of claim 1, wherein the switching ASIC comprises an embedded smart switch or a programmable gate array (FPGA).

7. The NIC of claim 1, wherein the NIC comprises a plurality of on-board transceivers directly coupled to the switching ASIC and functioning as external ports, wherein the plurality of on-board transceivers comprises 12 transmit channels and 12 receive channels, wherein the transmit channels are configured to collectively transmit data at a rate of up to 300 GB/sec, and wherein the receive channels are configured to collectively receive data at a rate of up to 300 GB/sec.

8. The NIC of claim 7, wherein the NIC comprises a plurality of multi-fiber push on (MPO) connectors, and wherein the MPOs comprise dynamic cables that dynamically connect one or more of the MPOs to one of the on-board transceivers.

9. A method for establishing a connection between virtual machines of a network, said method comprising:
installing, by a software program being operated by a network interface card (NIC), rules that route a Synchronize (SYN) packet from a source virtual machine (VM) through a software engine;
appending, by the software program, a signed cookie to the SYN packet;
verifying, by the software program, that a policy represented by the signed cookie appended to the SYN packet matches a policy of a destination VM;
returning, by the software program, the SYN packet to a source VM which establishes a connection between the source VM and the destination VM, and
wherein said verifying is performed after the SYN packet with the appended cookie (i) is routed by the NIC to the destination VM, (ii) examined in hardware of the destination VM, and (iii) returned by the NIC to the software engine.

10. The method of claim 9, wherein the software engine is external to, and is directly connected to, the NIC.

11. The method of claim 9, wherein the source VM is a server and the destination VM is a client.

* * * * *